United States Patent
Shin et al.

(10) Patent No.: US 11,146,953 B2
(45) Date of Patent: Oct. 12, 2021

(54) METHOD FOR UNLOCKING LOCKING DEVICE, AND ELECTRONIC DEVICE

(71) Applicant: Samsung Electronics Co., Ltd., Gyeonggi-do (KR)

(72) Inventors: Jae-Young Shin, Gyeonggi-do (KR); Se-Hwan Choi, Suwon-si (KR); Jung-Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 16/315,201

(22) PCT Filed: Jul. 4, 2017

(86) PCT No.: PCT/KR2017/007070
§ 371 (c)(1),
(2) Date: Jan. 4, 2019

(87) PCT Pub. No.: WO2018/008937
PCT Pub. Date: Jan. 11, 2018

(65) Prior Publication Data
US 2019/0239070 A1 Aug. 1, 2019

(30) Foreign Application Priority Data

Jul. 5, 2016 (KR) .................. 10-2016-0084854

(51) Int. Cl.
*H04W 12/06* (2021.01)
*H04W 12/61* (2021.01)
(Continued)

(52) U.S. Cl.
CPC ............ *H04W 12/06* (2013.01); *G06F 21/31* (2013.01); *G06F 21/32* (2013.01); *H04L 63/068* (2013.01);
(Continued)

(58) Field of Classification Search
CPC ....... H04W 12/06; H04W 4/80; H04W 12/61; H04W 12/04; H04W 12/08; G06F 21/31;
(Continued)

(56) References Cited

U.S. PATENT DOCUMENTS 5,241,598 A * 8/1993 Raith .................. H04L 9/16
380/248
5,550,529 A * 8/1996 Burge .................. E05B 17/147
340/5.6
(Continued)

FOREIGN PATENT DOCUMENTS

KR 10-1031490 B1 4/2011
KR 10-1211477 B1 12/2012
(Continued)

*Primary Examiner* — Jayesh M Jhaveri
(74) *Attorney, Agent, or Firm* — Cha & Reiter, LLC

(57) ABSTRACT

An electronic device used for unlocking a locking device is disclosed. The electronic device according to various embodiments of the present invention may comprise: a communication module for transmitting an unlock signal; and a processor which performs authentication with respect to a user so as to unlock a locking device, changes, after the user is authenticated, a valid time configured for a first key selected among one or more keys registered on an application, and transmits the unlock signal, including information on the changed valid time and information on the first key, via the communication module. Other various embodiments are also possible.

18 Claims, 12 Drawing Sheets

(51) Int. Cl.
*H04L 29/06* (2006.01)
*H04W 12/08* (2021.01)
*G06F 21/31* (2013.01)
*G06F 21/32* (2013.01)
*H04W 12/04* (2021.01)
*H04W 4/80* (2018.01)

(52) U.S. Cl.
CPC ........... *H04L 63/0861* (2013.01); *H04W 4/80* (2018.02); *H04W 12/04* (2013.01); *H04W 12/08* (2013.01); *H04W 12/61* (2021.01)

(58) Field of Classification Search
CPC ... G06F 21/32; H04L 63/068; H04L 63/0861; H04L 29/06
See application file for complete search history.

(56) References Cited

U.S. PATENT DOCUMENTS

| | | | | |
|---|---|---|---|---|
| 8,467,770 | B1 * | 6/2013 | Ben Ayed | H04L 63/107 455/411 |
| 8,498,618 | B2 * | 7/2013 | Ben Ayed | H04W 12/06 455/411 |
| 10,563,424 | B2 * | 2/2020 | Kim | G07C 9/33 |
| 10,872,484 | B1 * | 12/2020 | Pukari | H04W 12/61 |
| 2004/0021552 | A1 * | 2/2004 | Koo | G07C 9/257 340/5.53 |
| 2004/0054630 | A1 * | 3/2004 | Ginter | H04N 21/443 705/53 |
| 2011/0035604 | A1 * | 2/2011 | Habraken | G06F 21/34 713/193 |
| 2013/0167221 | A1 * | 6/2013 | Vukoszavlyev | H04W 12/04 726/16 |
| 2014/0120905 | A1 * | 5/2014 | Kim | G07C 9/00857 455/426.1 |
| 2014/0282877 | A1 * | 9/2014 | Mahaffey | H04W 12/08 726/3 |
| 2015/0222517 | A1 | 8/2015 | McLaughlin et al. | |
| 2016/0036814 | A1 * | 2/2016 | Conrad | H04L 63/0428 713/171 |

FOREIGN PATENT DOCUMENTS

| | | | |
|---|---|---|---|
| KR | 101211477 B1 | * | 12/2012 |
| KR | 10-2015-0131753 A | | 11/2015 |
| KR | 20150131753 A | * | 11/2015 |
| KR | 10-1617707 B1 | | 5/2016 |

* cited by examiner

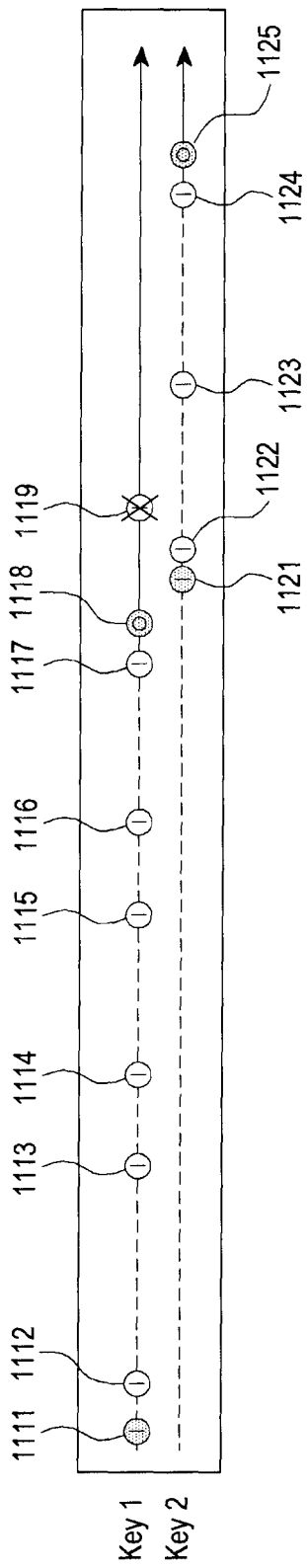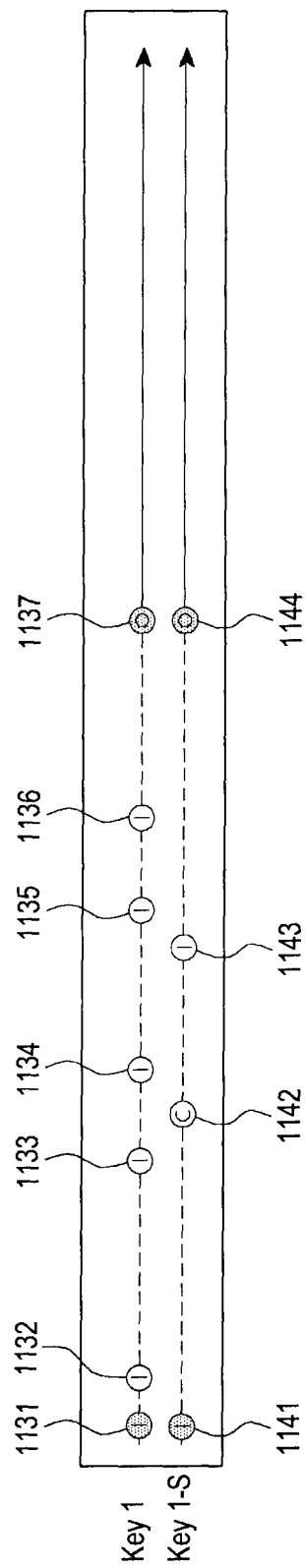

METHOD FOR UNLOCKING LOCKING DEVICE, AND ELECTRONIC DEVICE

CLAIM OF PRIORITY

This application is a National Phase Entry of PCT International Application No. PCT/KR2017/007070, which was filed on Jul. 4, 2017, and claims priority to Korean Patent Application No. 10-2016-0084854, which was filed on Jul. 5, 2016, the contents of which are incorporated herein by reference.

TECHNICAL FIELD

The present disclosure relates to a method and electronic device for unlocking a locking device. More specifically, the present disclosure relates to a method and electronic device for unlocking a security-enhanced locking device.

BACKGROUND ART

Recently, the use of electronic devices that are easy to carry, such as smartphones, tablet personal computers (PCs), wearable devices, etc., has increased, and the electronic devices provide various functions. For example, a variety of functions such as voice communication, data communication, Internet searching, taking photos or videos, music playback, video watching, etc., may be provided by the electronic devices.

As such, electronic devices have been widely used across various industrial fields, evolving from simple communication means to devices that provide diversified functions.

By supporting magnetic stripe transmission (MST) communication, as well as network communication and short-range communication, electronic devices have become available in association with various devices and have been substituted for payment means, unlocking means, etc. that were in use before.

For example, the electronic device may be used in place of a credit card used for purchasing goods or services, a key used for unlocking a locking device, and the like.

DETAILED DESCRIPTION OF THE INVENTION

Technical Problem

When unlocking a locking device is performed merely by an electronic device in place of an existing unlocking means (e.g., a card key of a magnetic card type or the like), a security weak point of the existing unlocking means may also occur when unlocking using the electronic device.

Various embodiments of the present disclosure are made to solve the foregoing or other problems, and provide an electronic device that provides a security-enhanced unlocking function and an operation method thereof.

Technical Solution

According to various embodiments of the present disclosure, an electronic device may include a communication module configured to transmit an unlocking signal and a processor configured to perform authentication with respect to a user to unlock a locking device, to change a valid time set in a first key selected from among at least one key registered in the electronic device when the user is authenticated, and to transmit the unlocking signal including information about the changed valid time and information about the first key through the communication module.

According to various embodiments of the present disclosure, in a non-transitory computer-readable recording medium having recorded thereon a program to be executed on a computer, the program may include instructions that cause, when executed by a processor, the processor to perform authentication with respect to a user to unlock a locking device, to change a valid time set in a first key selected from among at least one key registered in an electronic device when the user is authenticated, and to transmit an unlocking signal including information about the changed valid time and information about the first key through a communication module through the electronic device.

According to various embodiments of the present disclosure, a method for unlocking a locking device by an electronic device may include performing authentication with respect to a user to unlock a locking device, changing a valid time set in a first key selected from among at least one key registered in an electronic device when the user is authenticated, and transmitting an unlocking signal including information about the changed valid time and information about the first key through a communication module through the electronic device.

Advantageous Effects

According to various embodiments of the present disclosure, by changing a valid time of a key used to unlock a locking device registered in an electronic device, the electronic device may provide a security-enhanced unlocking function.

BRIEF DESCRIPTION OF DRAWINGS

FIG. 11A is a view for describing an unlockable time when a key corresponding to a locking device is used according to an example.

FIG. 11B is a view for describing an unlockable time when a key corresponding to a locking device is copied according to an example.

MODE FOR CARRYING OUT THE INVENTION

Figure 1:
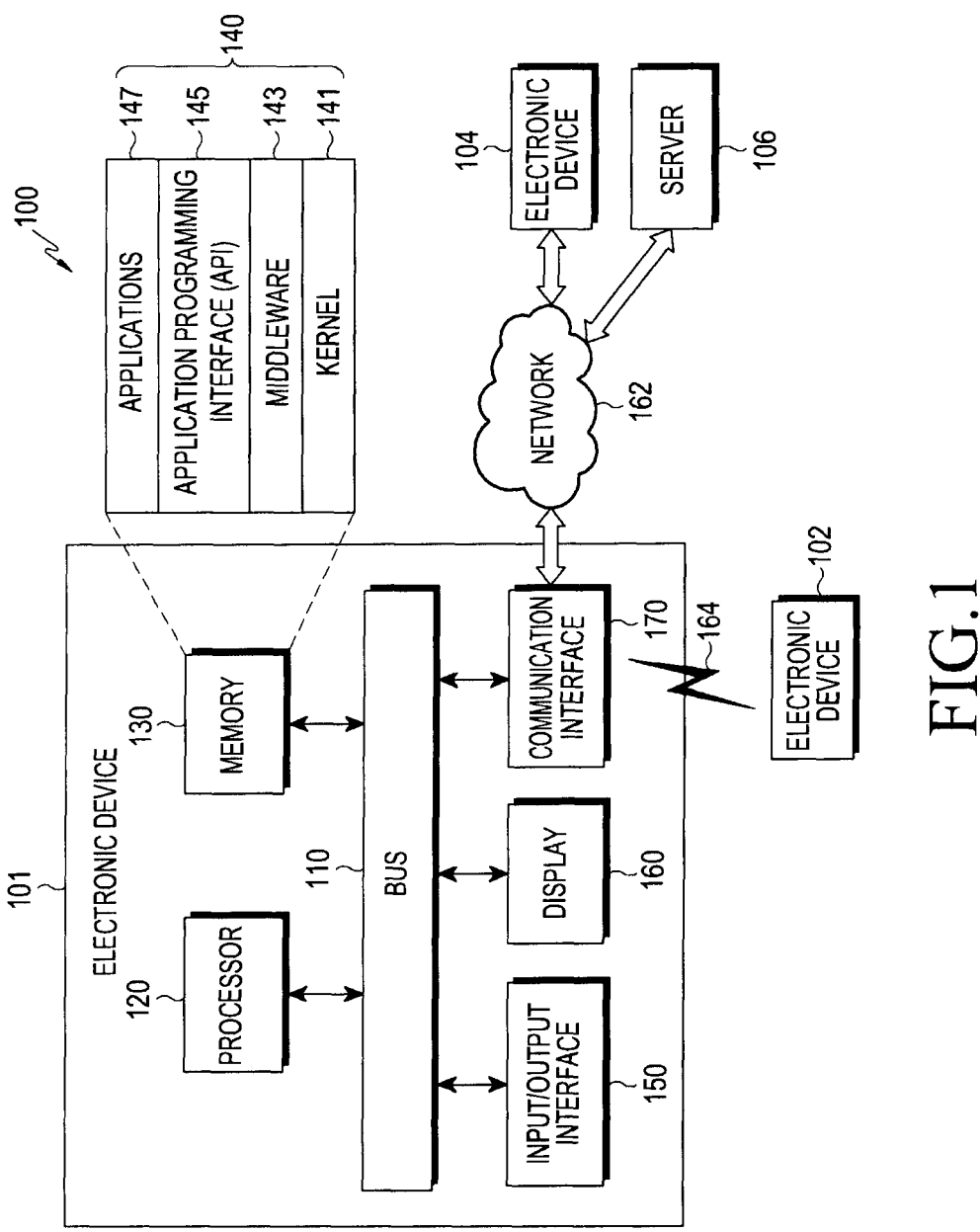
FIG. 1 illustrates a network environment including an electronic device according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. Examples of the wearable device may include at least one of an accessory type (e.g., a watch, a ring, a bracelet, an anklet, a necklace, glasses, contact lenses, head-mounted device (HMD., etc.), a fabric or cloth-integrated type (e.g., electronic clothing, etc.), a body-attached type (e.g., a skin pad, a tattoo, etc.), a body implanted type (e.g., an implantable circuit, etc.), and so forth. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 170 and delivering communication (e.g., a control message or data) between the elements 110 to 170. The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or a part of a body of a user. The communication interface 170 establishes communication between the electronic device 101 and an external device (e.g., the vehicle device 102, the electronic device 104, or the server 106). For example, the communication interface 170 may be connected to a network 162 through wireless communication or wired communication to communicate with an external device (e.g., the second external electronic device 104 or the server 106).

The wireless communication may include cellular communication using at least one of Long-Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to an embodiment, the wireless communication may include GNSS. The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of USB, HDMI, RS-232, power line communication, and POTS. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request that another device (e.g., the electronic devices 102 or 104 or the server 106) perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
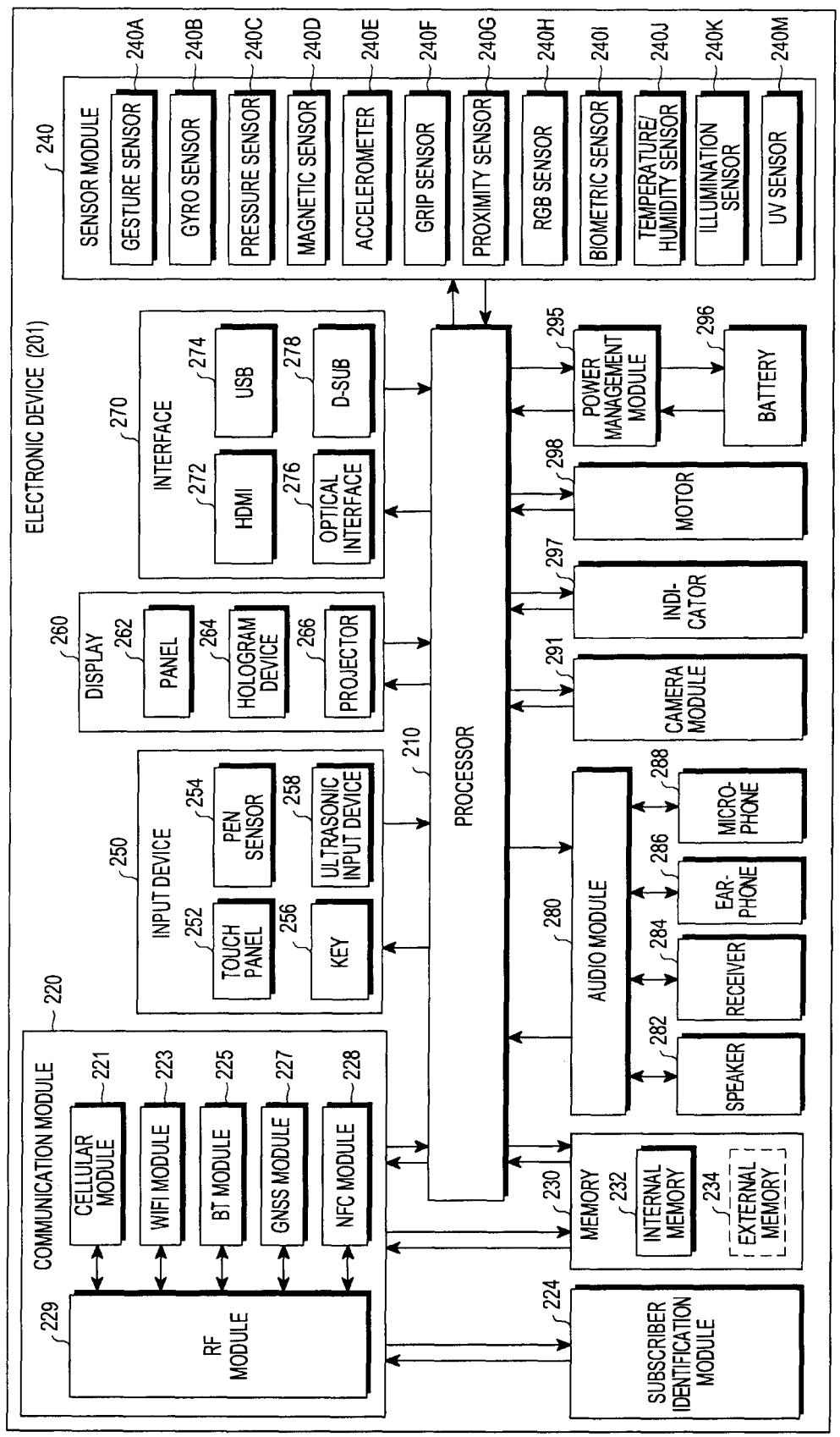
FIG. 2 is a block diagram of an electronic device according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an Operating System (OS) or an application program, and performs processing and operations with respect to various data. The processor 210 may be implemented with, for example, a system on chip (SoC). According to an embodiment of the present disclosure, the server 210 may include a GPU and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, a near field communication (NFC) module 228, and a radio frequency (RF) module 229. The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 may perform at least one of functions that may be provided by the processor 210. According to an embodiment, the cellular module 221 may include a communication processor (CP). According to an embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module. The SIM 224 may, for example, include a card including a SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random-access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid-state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201. According to an embodiment, the interface 270 may include a high-definition multimedia interface (HDMI) 272, a universal serial bus (USB) 274, an optical communication 276, or a D-subminiature 278. The interface 270 may be included in the communication interface 170 illustrated in FIG. 1. Additionally or alternatively, the interface 270 may include, for example, an MHL interface, an SD card/MMC interface, or an IrDA standard interface.

The audio module 280 may bi-directionally convert sound and an electric signal. At least one element of the audio module 280 may be included in the input/output interface 145 illustrated in FIG. 1. The audio module 280 may process sound information input or output through the speaker 282, the receiver 284, the earphone 286, or the microphone 288. The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
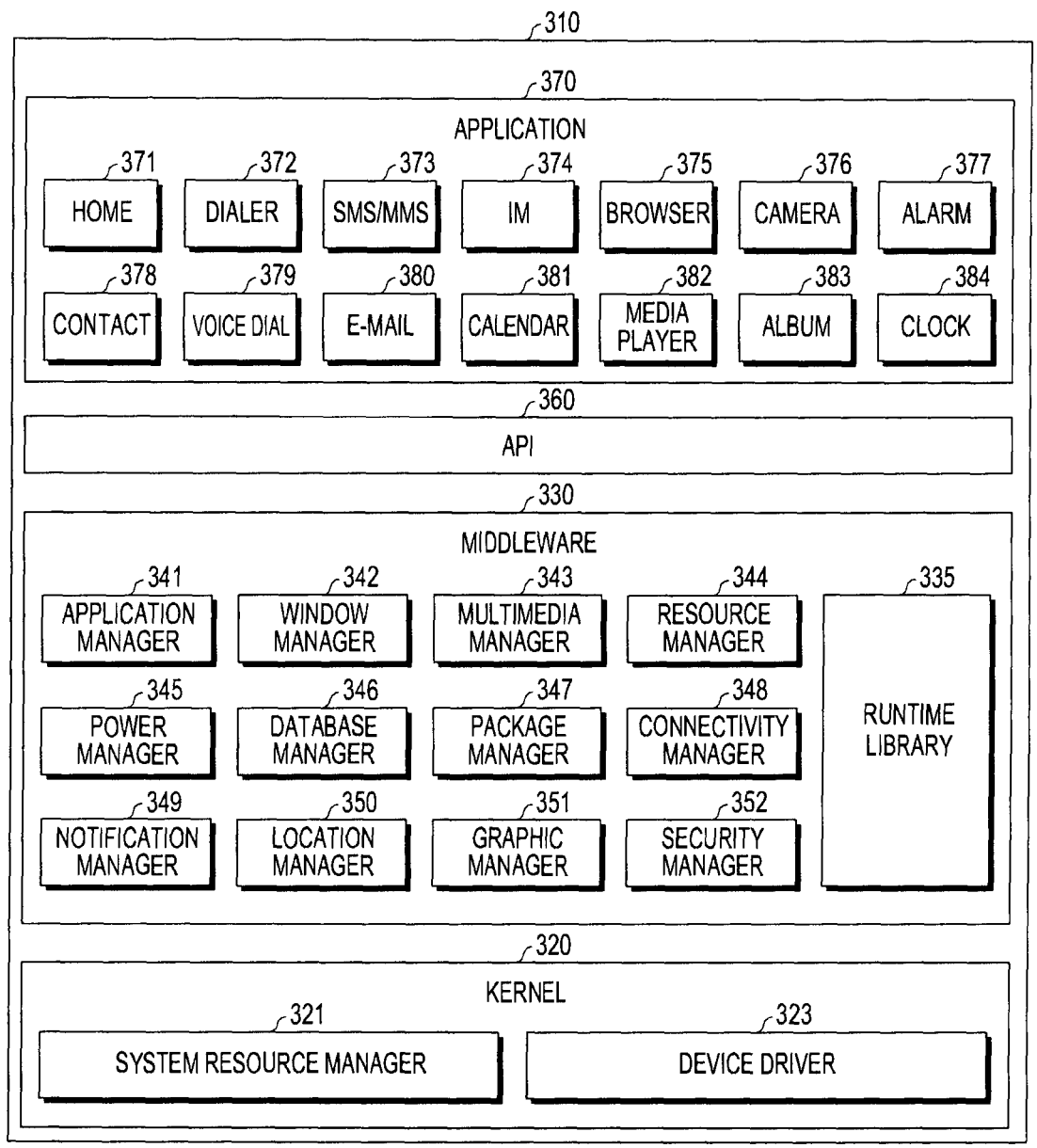
FIG. 3 is a block diagram of a programming module according to various embodiments of the present disclosure.

FIG. 3 is a block diagram of a programming module according to various embodiments. According to an embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Bada™. Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the vehicle device 102, the electronic device 104, or the server 106).

The kernel 320 may include a system resource manager 321 and/or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370. The window manager 342 manages a graphic user interface (GUI) resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format.

The connectivity manager 348 manages a wireless connection. The notification manager 349 provides an event, e.g., an arriving message, an appointment, proximity notification, etc. The location manager 350 manages location information of an electronic device. The graphic manager 351 manages, for example, a graphic effect to be provided to a user or a user interface relating thereto. The security manager 352 provides, for example, system security or user authentication. According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

Figure 4:
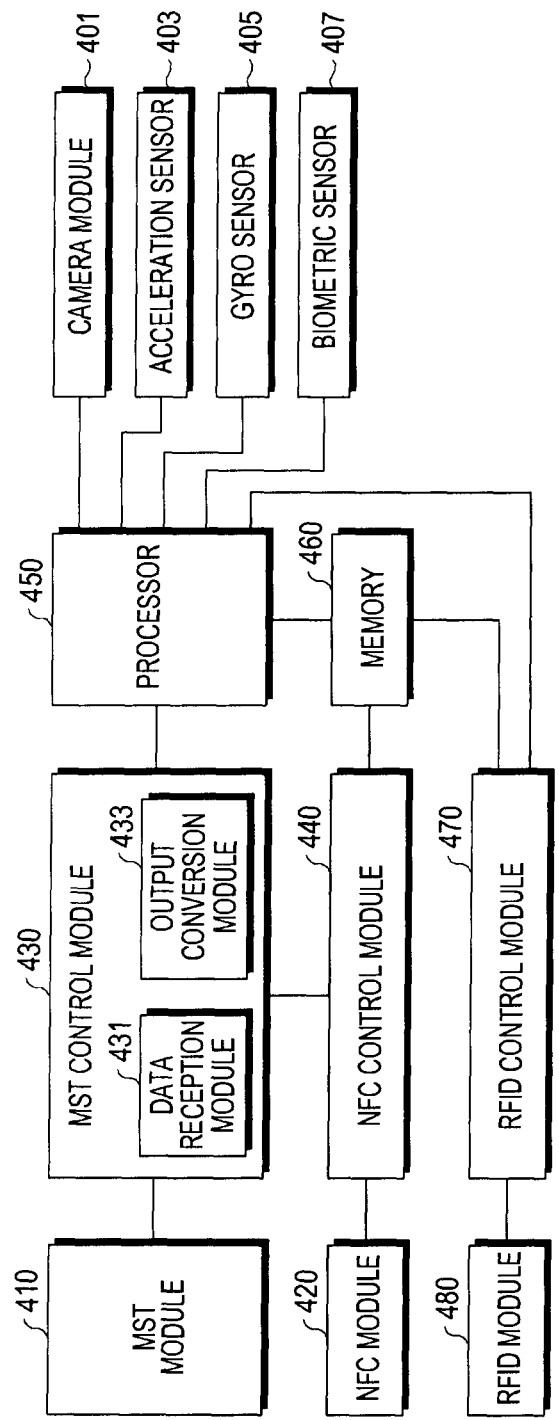
FIG. 4 is a block diagram showing an internal structure of an electronic device according to various embodiments of the present disclosure.

FIG. 4 is a block diagram showing the internal configuration of an electronic device according to various embodiments of the present disclosure.

According to various embodiments of the present disclosure, an electronic device 101 may include a camera module 401, an acceleration sensor 403, a gyro sensor 405, a biometric sensor 407, an MST module 410, an NFC module 420, an MST control module 430, an NFC control module 440, a processor 450, a memory 460, a radio frequency identification (RFID) control module 470, and an RFID module 480.

The camera module 401 may capture a real or physical key (e.g., a card key, etc.) used to unlock the locking device. The processor 450 may obtain issuance information required for issuing a key available to the electronic device 101 to unlock the locking device from an image of the real key captured by the camera module 401. Hereinbelow, the locking device may read in information used for unlocking, included in the real key, and determine whether to unlock the locking device based on the information. The locking device may read in the information from the real key through MST communication, NFC communication, RFID communication, or the like.

For example, the processor 450 may recognize the information of the real key, written in the real key, by using an optical character reader (OCR) function, and use the information of the real key as the issuance information.

According to an embodiment, the information of the real key may include various information for identifying at least one of the real key or the locking device unlockable by the real key. Thus, at least a part of the information of the real key may be used as the issuance information required for issuing a key available in the electronic device 101.

When the real key is used to unlock a locking device installed on a door of a hotel room, the information of the real key may include information for identifying the real key or the locking device unlockable by the real key, such as hotel information, room number, the location of the hotel, a card key identification number, and so forth.

The information of the real key may be input directly by a user into the electronic device 101 by using an input interface (e.g., a touch panel, a pen sensor, a key, an ultrasonic input device, a microphone, etc.) of the electronic device 101 without using the camera module 401.

The electronic device 101 may obtain the issuance information through a user's schedule-related application or by parsing an e-mail or short messaging service (SMS) message received by the user.

After obtaining the issuance information, the processor 450 may request that a server that manages the key issue the key by using the issuance information. For example, the processor 450 may request issuing the key by transmitting the issuance information to the server.

The server may be a server that manages an overall procedure related to use of the key such as the issuance, release, change of the key, etc., and information about the key. A detailed operation of the server will be described later.

When determining to issue the key for the electronic device 101, the server may transmit information indicating that the key has been issued and information about the key to the electronic device 101.

The processor 450 may receive the information indicating that the key has been issued and information about the key and register the key for unlocking a locking device by using the information about the key. The processor 450 may store the information about the key in the memory 460 or a separate internal security module (not shown). After registering the key in the application, the processor 450 may manage the registered key and the information about the key associated with each other. For example, the processor 450 may manage the key through an application for unlocking the locking device.

According to an embodiment, the information about the key may include information used to unlock the locking device corresponding to the key. The information about the key may be information included in magnetic stripes of a real card key when the real key is a magnetic card. The information about the key may also be information stored in an embedded security module of the real key.

For example, the information about the key may include at least one of serial information of the locking device corresponding to the key, the model name of the locking device corresponding to the key, information about the user who has issued the key, an access code of the key, sequence information of the key, or a management code of the key. However, this is merely an example for the sake of a description, and various types of information available for unlocking the locking device corresponding to the key may be used as the information about the key.

According to various embodiments of the present disclosure, the acceleration sensor 403 or the gyro sensor 405 may obtain position information (e.g., a moving speed, a tilt angle, a way the user is holding the electronic device, etc.) of the electronic device 101 when the locking device is unlocked. The obtained position information of the electronic device 101 may be delivered to the processor 450 that may adjust the strength of a magnetic field transmitted to the locking device from the MST module 410 based on the position information, or may select a coil to be used based on the position information when a plurality of coils are included in the electronic device 101.

According to various embodiments of the present disclosure, the processor 450 may perform authentication with respect to the user when the user attempts to unlock the locking device by using the electronic device 101. For example, the processor 450 may execute the application for unlocking the locking device according to a user's input and perform authentication with respect to the user through the application. The processor 450 may perform authentication with respect to the user, during execution of the application or when one key is selected by a user's input from among at least one key registered in the electronic device 101.

According to various embodiments of the present disclosure, the biometric sensor 407 may obtain biometric information (e.g., a fingerprint, an iris, voice, facial recognition, blood vessel shape, etc.) used for authentication with respect to the user. The obtained biometric information may be delivered to the processor 450 that may then perform authentication with respect to the user by comparing the obtained biometric information with previously stored biometric information.

When a valid time of a key issued for unlocking the locking device is maintained as a valid time that has been set at the time of issuing the key, solving a security problem such as copying the key or the like may be accompanied the inconvenience of re-issuing the key or directly controlling the locking device corresponding to the key. Moreover, when the locking device does not support a general communication function, the locking device may not be controlled remotely, adding another inconvenience. When the user fails to recognize a situation where the key is copied, the locking device may not be prevented from being unlocked by the copied key.

By changing the valid time of the key each time that user authentication is performed, the locking device may be prevented from being unlocked by the copied key later, even though the key is copied at a particular point in time.

According to various embodiments of the present disclosure, when the user is authenticated, the processor 450 may change the valid time set in a first key selected from among at least one key registered in the electronic device 101.

Hereinbelow, it may be described that when the user is authenticated, the valid time set in the first key is changed, but the change of the valid time set in the first key may also be performed when a user's intention to use the first key for unlocking the locking device is identified. For example, the processor 450 may change the valid time set in the first key when the application for unlocking the locking device is executed, before the user is authenticated.

The valid time may indicate the time at which the first key is validly available. For example, the first key may be used to unlock the locking device corresponding to the first key until the set valid time, and may not be used to unlock the locking device after the set valid time.

According to various embodiments of the present disclosure, the processor 450 may autonomously change the valid time set in the first key. To change the valid time set in the first key, the processor 450 may compare a first time, which results from adding a preset time to the time at which the user is authenticated, with the valid time set at the time of issuing the first key. The valid time set at the time of issuing the first key may be stored in the electronic device 101 at the time of issuing the first key, or the electronic device 101 may request that the server that manages the first key provide the valid time, and then may receive the valid time from the server.

The preset time may be set to guarantee a time from the time at which the user is authenticated to the time at which the user unlocks the locking device corresponding to the first key by using the first key. The valid time set at the time of issuing the first key may be a time at which the first key set during the issuance of the first key is validly available. For example, the valid time set at the time of issuing the first key may indicate a final valid time of the first key, which is set at the time of issuing the first key, and the valid time of the first key may not be changed into a time later than the valid time set at the time of issuing the first key. When the first key is a key used for unlocking the locking device installed in the door of a hotel room, the first key is issued when the user checks in, and a valid time set at the time of issuing the first key may be set as a time for the user to check out.

Thus, the processor 450 may compare the first time with the valid time set at the time of issuing the first key to determine whether the valid time of the first key can be changed into the first time.

According to various embodiments of the present disclosure, the processor 450 may change the valid time into the first time when the first time precedes or is earlier than the valid time set at the time of issuing the first key. On the other hand, the processor 450 may not change the valid time into the first time when the first time is later than the valid time set at the time of issuing the first key. In this case, the processor 450 may change the valid time of the first key into the valid time set at the time of issuing the first key.

To inform the server, which manages the first key, that the valid time of the first key has been changed, the processor 450 may transmit information about the changed valid time to the server that manages the first key. When autonomously changing the valid time of the first key, the processor 450 may inform the server that the valid time of the first key is changed. Thus, the server monitors whether the valid time of the key has been changed.

According to various embodiments of the present disclosure, the processor 450 may change the valid time set in the first key through the server that manages the first key. Thus, when the user is authenticated, the processor 450 may request that the server that manages the first key change the valid time set in the first key.

The server may change the valid time set in the first key in response to the request for changing the valid time, and transmit information about the changed valid time to the electronic device 101. A method for changing the valid time set in the first key by the server is the same as described above, and thus will not be described separately. The processor 450 may change the valid time based on the information about the changed valid time, received from the server.

According to various embodiments of the present disclosure, the processor 450 may transmit an unlocking signal including the information about the changed valid time and information about the first key through a communication module. The MST module 410, the NFC module 420, or the RFID module 480 may be used as the communication module that transmits the unlocking signal.

According to an embodiment, the MST module 410 may include a coil. The MST control module 430 may supply voltages in different directions to opposite ends of the coil according to data (e.g., a bit 0 or 1) and control the direction of a current flowing through the coil. The unlocking signal transmitted through the coil (a magnetic field signal through the current-flowing coil) may cause an induced electromotive force in the locking device in a pattern similar to an operation in which information that is used for unlocking a real card key is actually read by the locking device.

According to various embodiments of the present disclosure, the MST module 430 may include a data reception module 431 and an output conversion module 433. The data reception module 431 may receive the unlocking signal, which is a logical low/high pulse signal, including the information indicating the valid time and the information about the first key from the processor 450 or an embedded security module (not shown). The output conversion module 433 may include a circuit for converting the unlocking signal into a form required for delivering the unlocking signal received by the data reception module 431 to the MST module 410. The circuit may include an H-bridge that controls the direction of a voltage supplied to opposite ends of the MST module 410. The MST module 410 may receive the form-converted unlocking signal and transmit the same to the locking device. A detailed circuit diagram of modules used for MST communication will be described with reference to FIG. 5.

According to various embodiments of the present disclosure, the NFC control module 440 and the RFID control module 470 may receive the unlocking signal including the information indicating the valid time and the information about the first key, which is transmitted from the processor 450 or the embedded security module. The NFC control module 440 may include a circuit for converting the unlocking signal into a necessary form to deliver the unlocking signal received by the data reception module 431 to the MST module 420. The NFC control module 440 may convert the received unlocking signal through the circuit and deliver the converted unlocking signal to the NFC module 420. Similarly, the RFID control module 470 may also include a circuit for converting the unlocking signal into a form required for delivering the received unlocking signal including the information indicating the valid time and the information about the first key to the RFID module 480. The RFID control module 470 may convert the received unlocking signal through the circuit and deliver the converted unlocking signal to the RFID module 480. The NFC module 420 and the RFID module 480 may receive the form-converted unlocking signal and respectively transmit the same to the locking device.

According to various embodiments of the present disclosure, an electronic device may include a communication module configured to transmit an unlocking signal and a processor configured to perform authentication with respect to a user to unlock a locking device, to change a valid time set in a first key selected from among at least one key registered in the electronic device when the user is authenticated, and to transmit the unlocking signal including information about the changed valid time and information about the first key through the communication module.

According to various embodiments of the present disclosure, the processor may be further configured to perform authentication with respect to the user when the first key is selected from among the registered at least one key.

According to various embodiments of the present disclosure, the electronic device may further include a sensor configured to obtain biometric information of the user, and the processor may be further configured to perform authentication with respect to the user by comparing the biometric information of the user obtained through the sensor with previously stored biometric information.

According to various embodiments of the present disclosure, the processor may be further configured to compare a first time resulting from adding a preset time to a time at which the user is authenticated with the valid time set at the time of issuing the first key.

According to various embodiments of the present disclosure, the processor may be further configured to change the valid time into the first time when the first time is earlier than the valid time set at the time of issuing the first key, and to change the valid time into the valid time set at the time of issuing the first key when the first time is later than the valid time set at the time of issuing the first key.

According to various embodiments of the present disclosure, the processor may be further configured to transmit the information about the changed valid time to a server that manages the first key.

According to various embodiments of the present disclosure, the electronic device may further include a display, and the processor may be further configured to display, on the display, a message indicating that a locking device corresponding to the first key is unlockable through the first key, until the changed valid time set in the first key comes.

According to various embodiments of the present disclosure, the processor may be further configured to request that a server that manages the first key change the valid time when the user is authenticated.

According to various embodiments of the present disclosure, the processor may be further configured to change the valid time based on information indicating the valid time, which is received from the server by requesting the change of the valid time.

According to various embodiments of the present disclosure, the processor may be further configured to transmit the unlocking signal using MST communication or NFC.

According to various embodiments of the present disclosure, the processor may be further configured to transmit at least one of the information about the changed valid time and the information about the first key to an external electronic device operating in association with the electronic device.

According to various embodiments of the present disclosure, the external electronic device may be registered by the user to operate in association with the electronic device.

According to various embodiments of the present disclosure, the information about the first key may include at least one of serial information of the locking device corresponding to the first key, the model name of the locking device corresponding to the first key, information about a user who has issued the first key, an access code of the first key, sequence information of the first key, and a management code of the first key.

According to various embodiments of the present disclosure, the electronic device may further include a camera module and an input interface, and the processor may be further configured to obtain issuance information required for issuing the first key through the camera module or the input interface and to request that a server that manages the first key issue the first key, by using the obtained issuance information of the first key.

According to various embodiments of the present disclosure, the processor may be further configured to receive the information about the first key from the server that manages the first key and to register the first key in the electronic device by using the received information about the first key.

Figure 5:
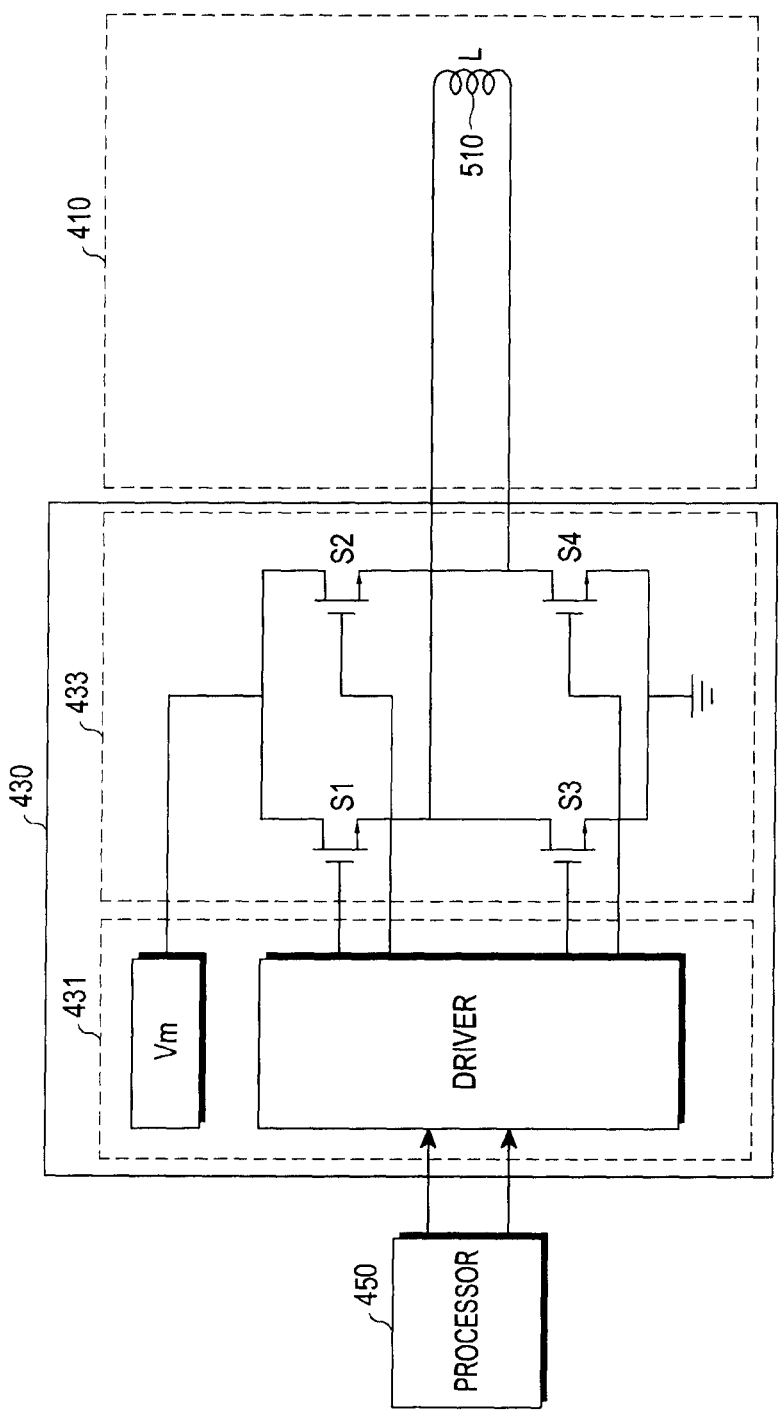
FIG. 5 is a circuit diagram of a magnetic stripe transmission (MST) control module and an MST module according to various embodiments of the present disclosure.

FIG. 5 is a circuit diagram of an MST control module and an MST module according to various embodiments of the present disclosure.

According to various embodiments of the present disclosure, the processor 450 may transmit the unlocking signal including the information indicating the valid time of the first key and the information about the first key, which are required for unlocking the locking device, to the MST control module 430. The information indicating the valid time of the first key and the information about the first key may be stored in a memory or an internal security module (e.g., an embedded secure element (eSE)/universal integrated circuit card (UICC)). The processor 450 may transmit the unlocking signal in a logical low/high form or a differential form. The processor 450 may sequentially transmit the information separately on a time basis or may transmit the information by alternately arranging the information.

The processor 450 may also transmit a control signal for enabling the MST control module 430 for a required time as well as the information required for unlocking.

According to various embodiments of the present disclosure, the data reception module 431 may include a power supply unit Vm and a driver. The power supply unit Vm may supply power to the output conversion module 433. The driver of the data reception module 431 may recognize the low/high state of the received unlocking signal as data (e.g., the bit 0 or 1). The driver of the data reception module 431 may also identify the number of conversions between low and high for a designated time and recognize the number as data. For example, when low/high transition during the designated time occurs once, the driver may recognize the bit 0; when low/high transition during the designated time occurs twice, the driver may recognize the bit 1.

The output conversion module 433 may include a circuit for converting the unlocking signal into a form required for delivering the unlocking signal received by the data reception module 431 to the MST module 410. The circuit may include a first switch S1, a second switch S2, a third switch S3, and a fourth switch S4. The first switch S1 and the fourth switch S4 may have the same control state, and the second switch S2 and the third switch S3 may have the same control state. Depending on a control state of the switches, the direction of a voltage supplied to opposite ends of a coil 510 included in the MST module 410 may be changed. For example, for the bit 0, the first switch S1 and the fourth switch S4 may be turned on, and the second switch S2 and the third switch S3 may be turned off, and vice versa.

The output conversion module 433 may change the direction of a magnetic field delivered to an external device (e.g., the locking device) through the coil 510 by changing the direction of the voltage (or the direction of the current) supplied to the opposite ends of the coil 510 based on data recognized by the data reception module 431. This pattern may be similar to a magnetic field generated when a magnetic card key is swiped through or inserted into a reader of the locking device. The switches S1, S2, S3, and S4 may include an N-type metal-oxide-semiconductor field-effect transistor (MOSFET), a P-type MOSFET, and a relay.

The MST module 410 may include the coil 510. The MST module 410 may further include an inductor, a capacitor, a resistor, and so forth. The MST module 410 may further include an amplifier for amplifying an unlocking signal. An NFC communication or wireless charging coil may be used in common with the coil 510, and a plurality of coils 510 may be used.

According to various embodiments of the present disclosure, the locking device may receive the unlocking signal from the electronic device 101. The locking device may recognize the information included in the unlocking signal based a transition period, e.g., a rising time, of the unlocking signal.

To improve the recognition rate of the unlocking signal delivered to the locking device, the number of turns of the coil 510 may be optimized.

Figure 6:
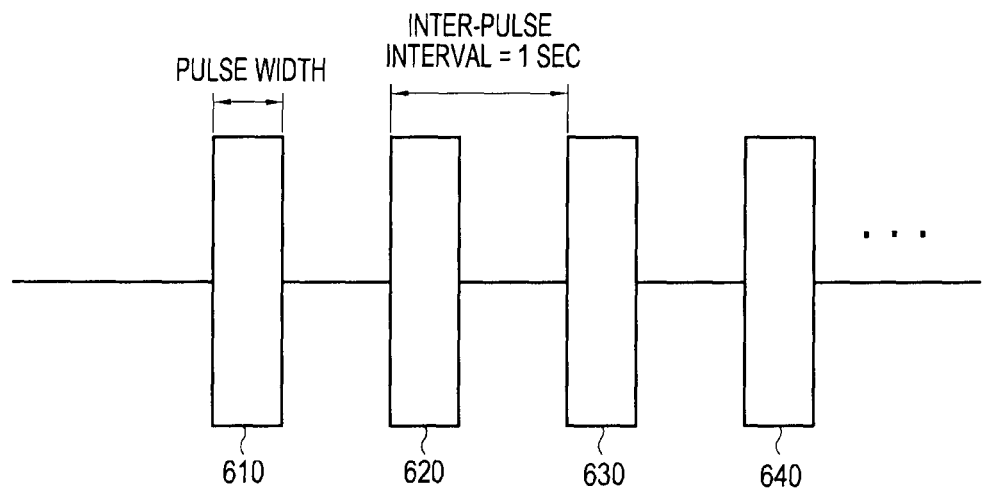
FIG. 6 is a diagram for describing a method for sending an unlocking signal by an electronic device according to various embodiments of the present disclosure.

FIG. 6 is a diagram for describing a method for sending an unlocking signal by an electronic device according to various embodiments of the present disclosure.

According to various embodiments of the present disclosure, the electronic device 101 may output unlocking signals 610, 620, 630, and 640 during a specific period through the MST module 410. For example, as shown in FIG. 6, the electronic device 101 may transmit the unlocking signals 610, 620, 630, and 640 once per second through the MST module 410. The first unlocking signal 610 and the second unlocking signal 620 may be output through different coils.

Figure 7:
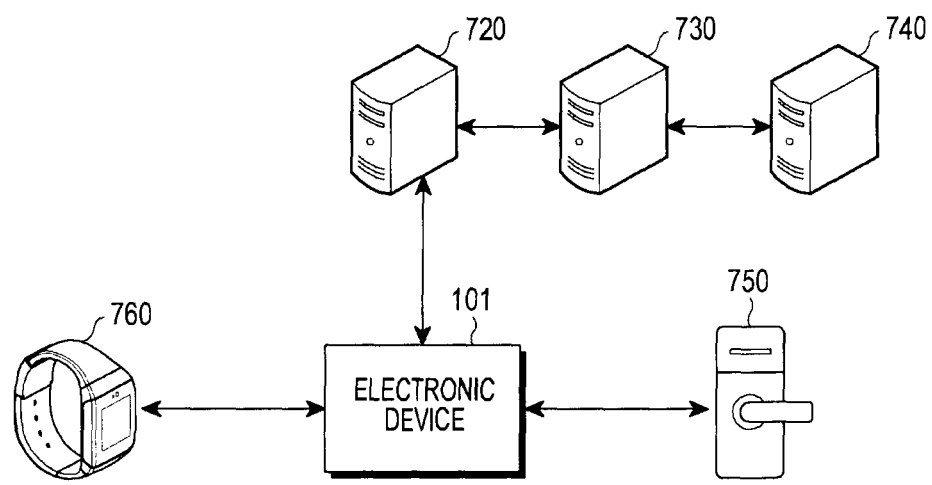
FIG. 7 is a diagram of a key issuance system used to unlock a locking device according to various embodiments of the present disclosure.

FIG. 7 is a diagram of a key issuance system used to unlock a locking device according to various embodiments of the present disclosure.

According to various embodiments of the present disclosure, the key issuance system may include the electronic device 101 and a server that manages a key issued to the electronic device 101. The server that manages the key may include a key server 720, a token server 730, and a key issuance server 740. The key server 720, the token server 730, and the key issuance server 740 may be implemented with different servers or in one server. The key issuance system may further include an external electronic device 760 operating in association with the electronic device 101.

According to various embodiments of the present disclosure, the electronic device 101 may include an application for unlocking the locking device. The application may manage a key used to unlock the locking device and provide a user interface associated with the issuance, registration, unlocking, access history management, etc., of the key. The application may provide an interface for obtaining issuance information for the key through, for example, a character reader (e.g., an OCR) or a user input. The application may provide a user interface associated with user authentication. The user may unlock the locking device by using the application and may be provided with information associated with the unlocking of the locking device.

The electronic device 101 may include information related to the user of the locking device and the locking device. For example, the electronic device 101 may include a software development kit (SDK) of a manufacturer of the locking device.

According to various embodiments of the present disclosure, the key server 720 may manage information of the key issued to the electronic device 101 in association with the electronic device 101. The key server 720 may also transmit and receive information between the electronic device 101 and other servers (e.g., the token server 730 and the key issuance server 740). For example, the key server 720 may receive issuance information required for issuing a key, together with an issuance request, from the electronic device 101. Upon receiving the issuance request and the issuance information, the key server 720 may determine whether to issue the key. When determining to issue the key to the electronic device 101, the key server 720 may request that the token server 730 and the key issuance server 740 issue the key. On the other hand, when determining not to issue the key to the electronic device 101, the key server 720 may transmit a signal indicating the rejection of key issuance to the electronic device 101.

According to various embodiments of the present disclosure, the token server 730 may issue, delete, or enable encrypted information such as a token, an access code, etc., of the key issued to the electronic device 101. Upon receiving the request for issuing the key from the key server 720, the token server 730 may issue or enable the encrypted information such as the token, the access code, etc., of the key and deliver the same to the key issuance server 740. The token server 730 may also control an available time of the issued or enabled encrypted information (e.g., a valid time set in the key). For example, the token server 730 may create, modify, or delete the valid time of the key. The token server 730 may deliver information about the valid time of the key to the key server 720.

Upon receiving a request for changing the valid time set in the key from the electronic device 101 through the key server 720, the token server 730 may change the valid time set in the key. A detailed method for changing the valid time by the token server 730 is the same as described above, and thus will not be described separately. The token server 730 may transmit information about the changed valid time to the electronic device 101 through the key server 720.

According to various embodiments of the present disclosure, the key issuance server 740 may create or enable the information about the key to be issued to the electronic device 101 and issue the key. The information about the key may be used to unlock the locking device corresponding to the key.

For example, upon receiving the request for issuing the key from the key server 720, the key issuance server 740 may create or enable the information about the key by using the encrypted information delivered from the token server 730. The information about the key may include at least one of serial information of the locking device corresponding to the first key, the model name of the locking device corresponding to the first key, information about a user who has issued the first key, the encrypted information (e.g., an access code, a token, etc.) of the first key, sequence information of the first key, or a management code of the first key. The key issuance server 740 may deliver information about the created or enabled key to the key server 720. The key server 720, having received the information about the key, may transmit a signal indicating that the key has been issued, the information about the valid time of the key, and the information about the key to the electronic device 101.

The electronic device 101 may receive the signal indicating that the key has been issued, the information about the valid time of the key, and the information about the key, and register the issued key. The electronic device 101 may set an initial valid time set in the key based on the information about the valid time of the key. Thereafter, the electronic device 101 may manage the information about the valid time of the key as valid time information set at the time of issuing the key, separately from valid time information set in the key. Thus, the electronic device 101 may manage the valid time information set at the time of issuing the key, even when the valid time set in the key is changed.

According to various embodiments of the present disclosure, the electronic device 101 may transmit at least one of information about the changed valid time and the information about the first key to the external electronic device 760 operating in association with the electronic device 101, in the course of unlocking of the locking device. The external electronic device 760 may be an external electronic device registered in the electronic device 101 to operate in association with the electronic device 101. To unlock the locking device by using the external electronic device 760, the user of the electronic device 101 may register the external electronic device 760 such that the external electronic device 760 operates in association with the electronic device 101. In this case, the electronic device 101 may transmit the information about the first key used for unlocking the locking device to the external electronic device 760 at the time of issuing the key or may change of the valid time of the key. The electronic device 101 may also transmit the information about the changed valid time to the external electronic device 760 at the time the valid time of the key is changed. Consequently, the user may also unlock the locking device using the external electronic device 760.

Figure 8:
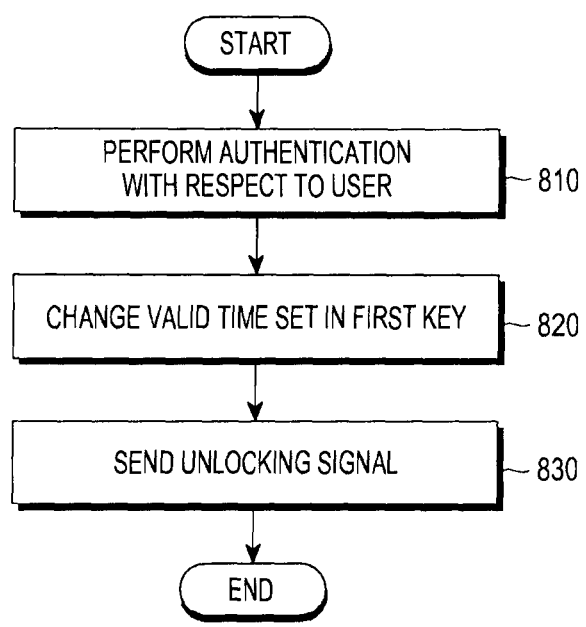
FIG. 8 is a flowchart illustrating an unlocking method by an electronic device according to various embodiments of the present disclosure.

FIG. 8 is a flowchart illustrating an unlocking method by an electronic device according to various embodiments of the present disclosure.

In operation 810, the electronic device 101 may perform authentication with respect to the user to unlock the locking device. For example, the electronic device 101 may perform authentication with respect to the user by using biometric information of the user obtained through the sensor or a password input by the user.

In operation 820, when the user is authenticated, the electronic device 101 may change the valid time set in the first key selected by the user from among at least one key registered in the electronic device 101. A detailed method for changing the valid time is the same as that described above, and thus will not be described separately.

In operation 830, the electronic device 101 may transmit an unlocking signal including the information about the changed valid time and information about the first key to the locking device through a communication module of the electronic device 101. According to an embodiment, the electronic device 101 may transmit the unlocking signal using a communication scheme supported by the locking device. For example, when the locking device supports only MST communication, the electronic device 101 may transmit the unlocking signal through an MST module. When the locking device supports MST and NFC, the electronic device 101 may transmit the unlocking signal by using at least one of an MST or NFC communication scheme.

According to various embodiments of the present disclosure, a method for unlocking a locking device by an electronic device may include performing authentication with respect to a user to unlock a locking device, changing a valid time set in a first key selected from among at least one key registered in an electronic device when the user is authenticated, and transmitting an unlocking signal including information about the changed valid time and information about the first key through a communication module through the electronic device.

Figure 9A:
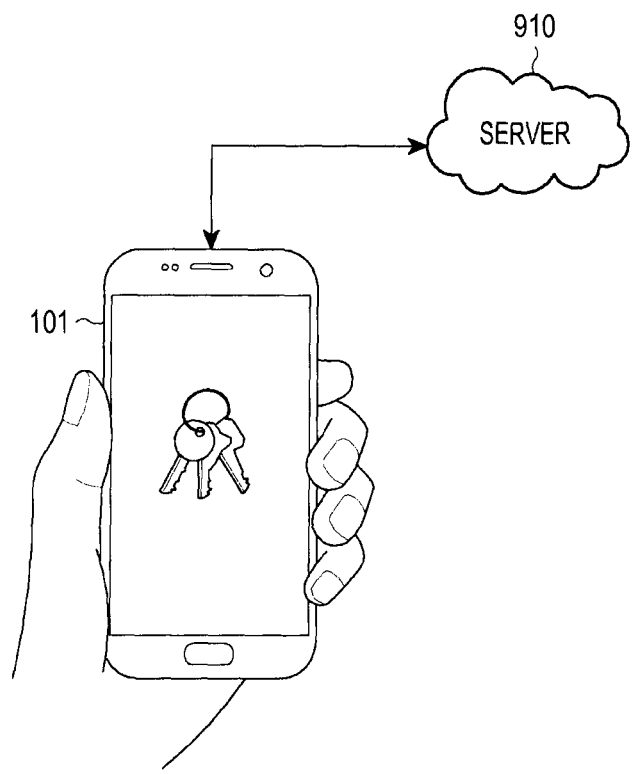
FIGS. 9A through 9C are views for describing an operation of an application for unlocking a locking device according to various embodiments.
Figure 9B:
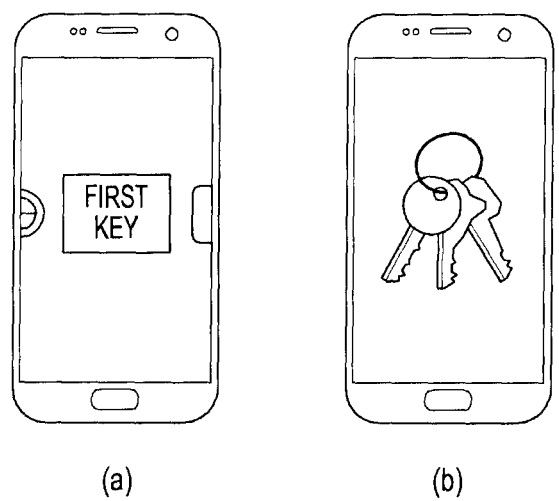
Figure 9C:
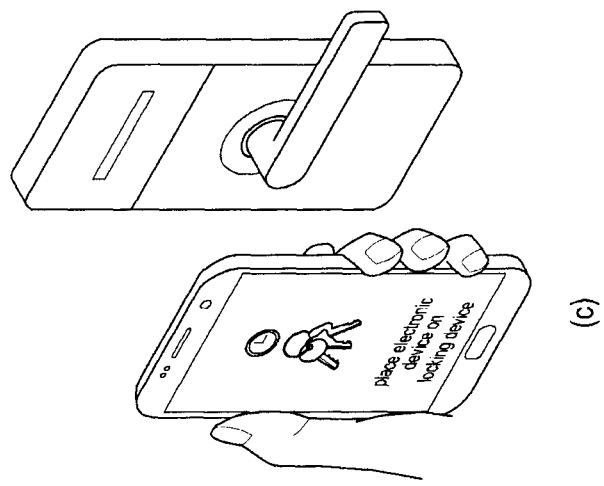

FIGS. 9A through 9C are views for describing an operation of an application for unlocking a locking device according to various embodiments.

According to various embodiments of the present disclosure, the electronic device 101 may receive a user input and execute an application used for unlocking the locking device. For example, the electronic device 101 may execute the application in response to a user input to swipe from a bezel region in the lower end of the electronic device 101 to the display of the electronic device 101.

According to various embodiments of the present disclosure, the electronic device 101 may request that the server that manages the key issue the key, and once the server determines to issue the key to the electronic device 101, the electronic device 101 may receive the issued key from the server. In this case, as shown in FIG. 9A, the electronic device 101 may register the issued key and display the registered key on the application. The application may manage the registered key and the information about the key associated with each other. An external server operable in association with the electronic device 101 may store information about any key related to the user of the electronic device 101. Thus, when the user replaces the electronic device 101 with a new electronic device, the information about any key related to the user may be transferred to the new electronic device.

As shown in (a) of FIG. 9B, the electronic device 101 may display at least one key registered in the electronic device 101 on the display through the application. As shown in (b) of FIG. 9B, the electronic device 101 may also display an image in which any locking device may be unlocked by one key. When the application is executed or authentication with respect to the user is performed, the electronic device 101 may sense a signal from the locking device and automatically select and display a key corresponding to the sensed signal from among at least one key registered in the electronic device 101.

According to various embodiments of the present disclosure, after executing the application, the electronic device 101 may select the first key to be used for unlocking the locking device from among at least one previously registered key according to a user's input. For example, as shown in (a) of FIG. 9B, when at least one registered key is displayed, the electronic device 101 may select the first key from among the at least one registered key according to a user input to scroll left/right. The electronic device 101 may also sense a signal from the locking device and automatically select a key related to the sensed signal as the first key.

As shown in (a) of FIG. 9C, when the first key is selected, the electronic device 101 may perform authentication with respect to the user. The electronic device 101 may perform authentication with respect to the user by using biometric information of the user or a password obtained from the user, etc.

As shown in (b) of FIG. 9C, once the user is authenticated, the electronic device 101 may display, on the display, a timer indicating a changed valid time of the first key to inform the user of the changed valid time of the first key. The electronic device 101 may also output guiding words such as "Place Electronic Device on Locking Device." on the display to guide the way to unlock the locking device by using the first key, as shown in (b) of FIG. 9C.

As shown in (c) of FIG. 9C, when the user places the electronic device 101 close to the locking device, the locking device may receive an unlocking signal transmitted from the electronic device 101 and determine whether to be unlocked based on the unlocking signal. When the locking device determines to be unlocked, locking of the locking device may be released.

Upon completion of unlocking of the locking device, the user may terminate the application by pressing a button (e.g., a home button) of the electronic device 101. To resume unlocking of the locking device, the electronic device 101 may again perform authentication with respect to the user. When unlocking the locking device is completed, the electronic device 101 may directly recognize unlocking of the locking device, or may stop generating the unlocking signal in response to a user's input. For example, when being unlocked, the locking device may notify the electronic device 101 of unlocking over a network, or when not being connected to the network, the locking device may indicate the unlocking thereof through a sound generated therein, a light emitting diode (LED) lamp, etc.

Until the changed valid time set in the first key arrives, the electronic device 101 may display, on the display, a message indicating that the locking device is unlockable through the first key, or periodically indicate so using a sound.

According to an embodiment, the electronic device 101 may indicate the direction in which the strength of the unlocking signal (e.g., a magnetic field output to the locking device) is high based on the position of a coil included in the electronic device 101. For example, when the coil is positioned in the upper end of the electronic device 101, the electronic device 101 may provide an indication (e.g., an image, a text, a sound, etc.) of needing to place the upper end part of the display close to the locking device. In another example, when there are a plurality of coils in the electronic device 101, the electronic device 101 may identify, based on the way the user is holding the electronic device, the direction in which the strength of the unlocking signal is high, and provide an indication of needing to place the electronic device 101 close to the locking device in the identified direction.

Figure 10:
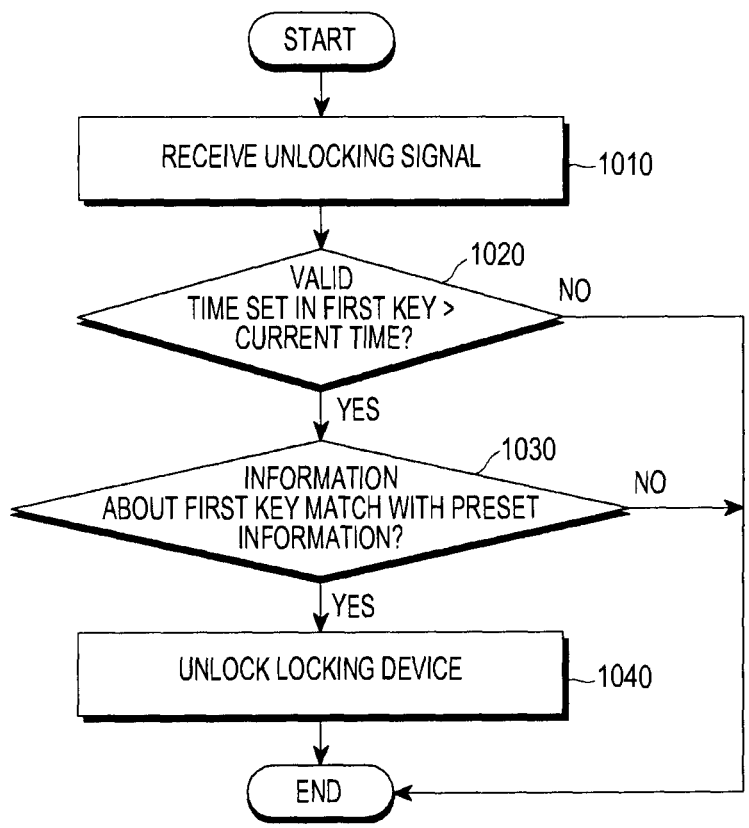
FIG. 10 is a flowchart of an operation of a locking device according to various embodiments of the present disclosure.

FIG. 10 is a flowchart of an operation of a locking device according to various embodiments of the present disclosure.

In operation 1010, the locking device may receive the unlocking signal from the electronic device 101. The electronic device 101 may transmit the unlocking signal using a communication scheme supported by the locking device.

In operation 1020, the locking device may determine whether the valid time set in the first key, included in the unlocking signal, is later than the current time. The locking device may compare the current time identified by a clock thereof with the valid time set in the first key. When the valid time set in the first key precedes the current time, the locking device may reject unlocking.

In operation 1030, when the valid time set in the first key is later than the current time, the locking device may determine whether information about the first key, included in the unlocking signal, matches the information that is preset in the locking device. For example, the locking device may determine a match by comparing the preset information, such as an access code or a token, with information such as an access code or a token included in information about the first key. The locking device may reject unlocking when the information about the first key does not match with the information that is preset in the locking device.

In operation 1040, the locking device may unlock the locking device when the information about the first key matches the information that is preset in the locking device.

FIG. 11A is a view for describing an unlockable time when a key corresponding to a locking device is used according to an example.

In FIG. 11A, it is assumed that a first key, key 1, is the real key issued to a first user, a second key, key 2, is the real key issued to a second user, and both the first key and the second key are used to unlock the same locking device. It is also assumed that the issuance time of the first key is a time 1111, the valid time set in the first key is a time 1118, the issuance time of the second key is a time 1121, and the valid time set in the second key is a time 1125.

The first user may use the first key to unlock the locking device from the issuance time of the first key, the time 1111, to the valid time set in the first key, the time 1118. Thus, when the first user attempts to unlock the locking device by using the first key at a time 1112 through a time 1117, the locking device may be unlocked. However, when the first user attempts to unlock the locking device at a time 1119, the locking device is not unlocked.

Similarly, the second user may use the second key to unlock the locking device from the time 1121, which is the issuance time of the first key, to the time 1125, which is the valid time set in the second key. Thus, when the second user attempts to unlock the locking device by using the second key at a time 1122 through a time 1124, the locking device may be unlocked. However, when the second user attempts to unlock the locking device at a time 1125, the locking device is not unlocked.

FIG. 11B is a view for describing an unlockable time when a key corresponding to a locking device is copied according to an example.

In FIG. 11B, it is assumed that the first key, Key 1, is the real key issued to the first user, and a second key, Key 1-S, is a key created by copying the first key at a time 1142. It is also assumed that the issuance time of the first key is a time 1131 and the valid time set in the first key is a time 1137. Thus, when the first user attempts to unlock the locking device by using the first key at a time 1132 through a time 1136, the locking device may be unlocked.

Since the second key has been created by copying the first key, the issuance time of the second key may be set to a time 1141 that coincides with a time 1131, which is the issuance time of the first key, and the valid time of the second key may be set to a time 1144, which coincides with the time 1137, that is the valid time of the first key. As stated above, a valid time set at the time of issuance is maintained in a real key. When the first user does not recognize whether the first key is copied and thus does not receive re-issuance of the first key, the second user may not be prevented from entering a room by using the second key until the valid time set in the first key, thus causing a security problem. For example, when the second user attempts to unlock the locking device at a time 1143 by using the second key, the locking device may be unlocked using the second key created by copying the first key.

Figure 11C:
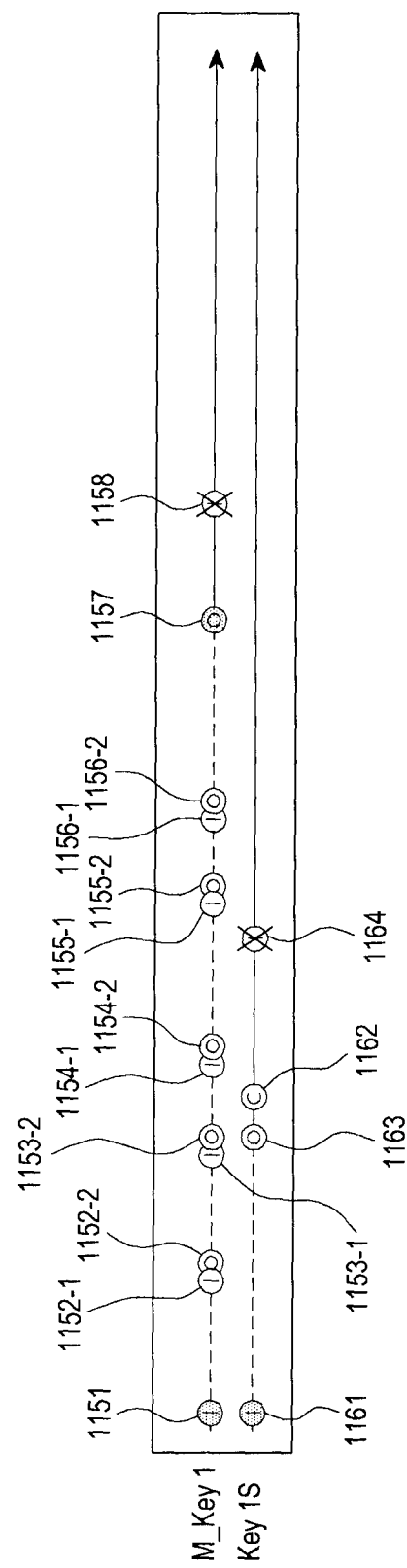
FIG. 11C is a view for describing an unlockable time when an electronic device that provides an unlocking function according to various embodiments of the present disclosure is used.

FIG. 11C is a view for describing an unlockable time when an electronic device that provides an unlocking function according to various embodiments of the present disclosure is used.

In FIG. 11C, it is assumed that the first key, Key 1, is the real key issued to the electronic device 101, and a second key, Key 1S, is the key created by copying the first key at a time 1162. The second key may be a copied key including information about the key issued to the electronic device 101 and information about a valid time set in the first key at the time 1162, and may be a key copied using another electronic device or a real copied key including the foregoing information.

The issuance time of the first key may be a time 1151 and the valid time set in the first key may be a time 1157. Thus, when attempting to unlock the locking device at a time 1152-1, a time 1153-1, a time 1154-1, a time 1155-1, and a time 1156-1 (for example, performing user authentication to unlock the locking device or executing an application used for unlocking, etc.), the electronic device 101 may change the valid time set in the first key into a time 1152-2, a time 1153-1, a time 1154-2, a time 1155-2, and a time 1156-2 by adding a preset time (e.g., 1 to 5 minutes) to the time 1152-1, the time 1153-1, the time 1154-1, the time 1155-1, and the time 1156-1, respectively. Thus, the locking device may be unlocked when the first user attempts to unlock the locking device at a time 1151-1 through a time 1151-2, a time 1152-2 through a time 1152-2, a time 1153-1 through a time 1153-2, a time 1154-1 through a time 1154-2, a time 1155-1 through a time 1155-2, and a time 1156-1 through a time 1156-2.

However, when the first user attempts to unlock the locking device at a time 1158 later than the time 1157, which is the valid time set at the time of issuing the first key, the valid time set in the first key is not changed. Thus, when the first user attempts to unlock the locking device at the time 1158, the locking device is not unlocked. For example, to change the valid time set in the first key, the electronic device 101 may compare a time at which the user is authenticated or a time at which the application is executed with the valid time set at the time of issuing the first key. When the time at which the user is authenticated or the time at which the application is executed is later than the valid time set at the time of issuing the first key, the electronic device 101 may not change the valid time set in the first key.

Since the second key has been created by copying the first key at the time 1162, the valid time of the second key is set to a time 1163 that coincides with the time 1153-2, which is the valid time set in the first key at the time 1162. Thus, when the second user having created the second key by copying the first key attempts to unlock the locking device at a time 1164, the locking device may not be unlocked. In other words, since the time 1163, which is the valid time set in the second key, precedes the time 1164 at which unlocking the locking device is attempted using the second key, the locking device may reject unlocking.

As such, even before the valid time set at the time of issuing the first key comes, the valid time set in the first key is changed each time when unlocking the locking device is attempted, thereby preventing the locking device from being unlocked using the second key created by copying the first key.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions.

The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

According to various embodiments of the present disclosure, in a non-transitory computer-readable recording medium having recorded thereon a program to be executed on a computer, the program may include instructions that cause, when executed by a processor, the processor to perform authentication with respect to a user to unlock a locking device, to change a valid time set in a first key selected from among at least one key registered in an electronic device when the user is authenticated, and to transmit an unlocking signal including information about the changed valid time and information about the first key through a communication module through the electronic device.

According to various embodiments of the present disclosure, the executable instructions may cause the processor further to compare a first time resulting from adding a preset time to a time at which the user is authenticated with the valid time set at the time of issuing the first key.

According to various embodiments of the present disclosure, the change of the valid time may further include changing the valid time into the first time when the first time is earlier than the valid time set at the time of issuing the first key, and changing the valid time into the valid time set at the time of issuing the first key when the first time is later than the valid time set at the time of issuing the first key.

According to various embodiments of the present disclosure, the executable instructions may cause the processor further to request that a server that manages the first key change the valid time when the user is authenticated and the processor further to change the valid time based on information indicating the valid time, which is received from the server by requesting the change of the valid time.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. An electronic device comprising:
a communication module; and
a processor configured to:
identify a first key from among at least one key registered in the electronic device;
perform authentication with respect to a user to unlock a locking device;
identify a first time resulting from adding a preset time to a time at which the user is authenticated;
in response to identifying that the first time is earlier than an initial valid time of the first key, change the valid time of the first key to the first time; and
transmit an unlocking signal comprising information about the changed valid time and information about the first key through the communication module to unlock the locking device.

2. The electronic device of claim 1, wherein the processor is further configured to perform the authentication with respect to the user when the first key is selected from among the registered at least one key.

3. The electronic device of claim 1, further comprising a sensor configured to obtain biometric information of the user,
wherein the processor is further configured to perform the authentication with respect to the user by comparing the biometric information of the user obtained through the sensor with previously stored biometric information.

4. The electronic device of claim 1, wherein the processor is further configured to:
in response to identifying that the first time is later than the initial valid time of the first key, maintain the valid time at the initial valid time.

5. The electronic device of claim 4, wherein the processor is further configured to transmit the information about the changed valid time to a server that manages the first key.

6. The electronic device of claim 1, further comprising a display,
wherein the processor is further configured to display, on the display, a message indicating that a locking device corresponding to the first key is unlockable through the first key, until the changed valid time set in the first key comes.

7. The electronic device of claim 1, wherein the processor is further configured to:
when the user is authenticated, request a server that manages the first key to change the valid time.

8. The electronic device of claim 1, wherein the processor is further configured to transmit the unlocking signal by using magnetic stripe transmission (MST) communication or near field communication (NFC).

9. The electronic device of claim 1, wherein the processor is further configured to transmit at least one of the information about the changed valid time and the information about the first key to an external electronic device operating in association with the electronic device.

10. The electronic device of claim 9, wherein the external electronic device is registered by the user to operate in association with the electronic device.

11. The electronic device of claim 1, wherein the information about the first key comprises at least one of serial information of the locking device corresponding to the first key, a model name of the locking device corresponding to the first key, information about a user issuing the first key, an access code of the first key, sequence information of the first key, and a management code of the first key.

12. The electronic device of claim 1, further comprising:
a camera module; and
an input interface,
wherein the processor is further configured to:
obtain issuance information required for issuing the first key through the camera module or the input interface; and
request a server that manages the first key to issue the first key, by using the obtained issuance information of the first key.

13. The electronic device of claim 12, wherein the processor is further configured to:
receive the information about the first key from the server that manages the first key; and
register the first key in the electronic device by using the received information about the first key.

14. A non-transitory computer-readable recording medium having recorded thereon a program to be executed on a computer,
wherein the program comprises executable instructions that cause, when the processor to:
identify a first key from among at least one key registered in an electronic device;
perform authentication with respect to a user to unlock a locking device;
identify a first time resulting from adding a preset time to a time at which the user is authenticated;
in response to identifying that the first time is earlier than an initial valid time of the first key, change the valid time of the first key to the first time; and
transmit an unlocking signal comprising information about the changed valid time and information about the first key through a communication module included in the electronic device to unlock the locking device.

15. The computer-readable recording medium of claim 14, wherein the change of the valid time further comprises:
maintain the valid time at the initial valid time in response to identifying that the first time is later than the initial valid time of the first key.

16. The computer-readable recording medium of claim 14, wherein the executable instructions cause the processor further to:
when the user is authenticated, requesting a server that manages the first key to change the valid time to the first time; and
change the valid time based on information indicating the valid time, which is received from the server in response to requesting the change of the valid time.

17. A method of unlocking a locking device in an electronic device, comprising:
identifying a first key from among at least one key registered in the electronic device;
performing authentication with respect to a user to unlock a locking device;
identifying a first time resulting from adding a preset time to a time at which the user is authenticated;
in response to identifying that the first time is earlier than an initial valid time of the first key, changing the valid time of the first key to the first time; and
transmitting an unlocking signal comprising information about the changed valid time and information about the first key through a communication module included in the electronic device to unlock the locking device.

18. The electronic device of claim 7, wherein the processor is further configured to:
 change the valid time based on information indicating the valid time, which is received from the server in response to the request to change the valid time.

\* \* \* \* \*